Dec. 13, 1949  R. D. ACTON  2,491,354
LIFT FOR IMPLEMENTS
Filed Dec. 29, 1945  2 Sheets-Sheet 1

Inventor:
Russel D. Acton
By Paul O. Rippel
Atty.

Dec. 13, 1949   R. D. ACTON   2,491,354
LIFT FOR IMPLEMENTS
Filed Dec. 29, 1945   2 Sheets-Sheet 2

Inventor:
Russel D. Acton
By Paul O. Pippel
Atty.

Patented Dec. 13, 1949

2,491,354

UNITED STATES PATENT OFFICE 2,491,354

LIFT FOR IMPLEMENTS

Russel D. Acton, Chicago, Ill.

Application December 29, 1945, Serial No. 638,261

6 Claims. (Cl. 56—10)

1

This invention relates to an improved means for lifting an implement and particularly to a means for lifting and mounting an agricultural implement on a tractor. More specifically it relates to a lifting device for mounting a harvester thresher on a tractor.

An object of the present invention is to provide an improved lifting means for mounting an implement.

Another object is to provide an improved lifting means for mounting an agricultural implement on a tractor.

Another object is to provide a lifting device for mounting an implement on a tractor, said lifting device including a fluid pressure means that is actuated by the power actuating mechanism of a tractor.

Another object is to provide a lifting device for an agricultural implement that is actuated by the power lift of a tractor and the elevation of which can easily be controlled from an operator's station on the tractor while the operator is moving the tractor adjacent said implement, thereby bringing mounting portions on the tractor and on the implement in proper alinement for mounting connection.

Another object is to provide an implement lifting structure adapted to mount an agricultural implement onto a tractor, said implement lifting structure being adapted to be placed in a retracted position upon mounting of said agricultural implement on said tractor.

These and other desirable objects inherent in and encompassed by the invention will be more clearly understood upon reading the ensuing description with reference to the annexed drawings, wherein.

Figure 1:
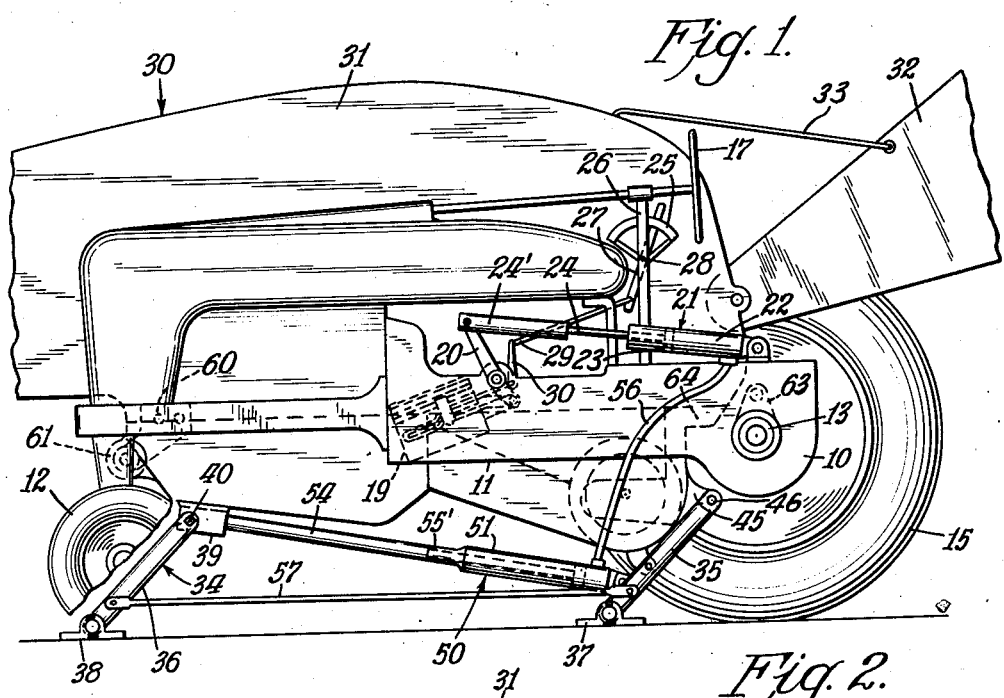
Figure 1 is a side elevational view of a tractor and a harvester thresher, said harvester thresher being supported from the ground by an implement lifting structure.
Figure 2:
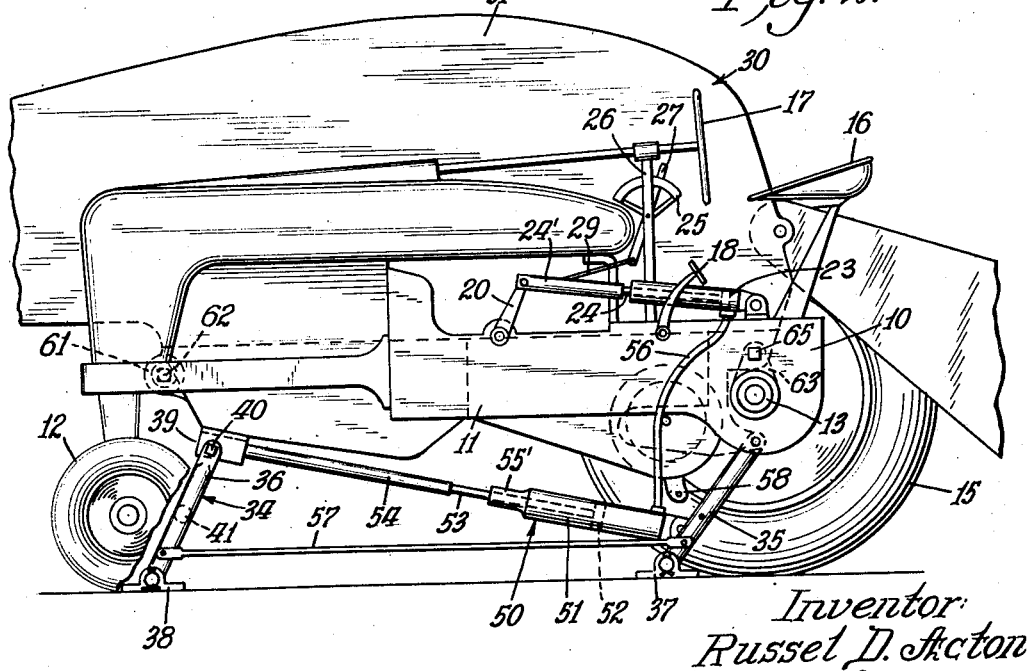
Figure 2 is a side elevational view of a tractor having a harvester thresher mounted thereon, showing an implement lifting structure in its lifting position.

The reference character 10 generally indicates a tractor having a longitudinal body 11 supported at one end on a front rolling support 12. Connected to the rear of the longitudinal body portion 11 is a left-hand axle housing 13 and a right-hand extended axle housing 14 on which are supported ground wheels 15. An operator's station 16 is mounted within close proximity to a steering mechanism 17 and a clutch control pedal 18 for controlling the operation of said tractor 10. Enclosed within the longitudinal body portion 11 is a power actuating device 19 which is connected to a power lift arm 20, said power lift arm 20 being pivotally connected to the longitudinal body 11. A fluid pressure device 21 is rigidly supported on the longitudinal body 11 and includes a cylinder 22 having a piston 23 which is connected to a piston rod 24. The piston rod 24 is connected to a piston rod extension 24' which is pivotally connected to the actuating arm 20. A detent mechanism 25 is mounted on a standard 26 adjacent the operator's station 16. A manual control lever 27 is pivotally connected to the detent mechanism 25 as indicated at 28. A push rod 29 is connected to the movable lever 27 at one end and to an actuating lever 30 at its other end. The actuating lever 30 is adapted to regulate valves not shown, which control the operation of the power actuating device 19. Movement of the actuating lever 30 permits the oscillation of the arm 20 to a plurality of positions as may be desired. This valve means and control therefor are shown and described in the application of Carl W. Mott, Serial No. 527,625, filed March 22, 1944, now Patent 2,409,510, and entitled Power adjusting mechanism.

A harvester thresher is indicated at 30 and includes a thresher part 31 and a harvester part 32. A link 33 is adapted to secure said harvester part 32 out of working position, as shown in Figure 1.

An implement lifting structure is generally indicated by the reference character 34 and includes a pair of forward lifting struts 35 and a pair of rearward lifting struts 36 to which are hingedly connected supporting feet 37 and 38, respectively.

Figure 3:
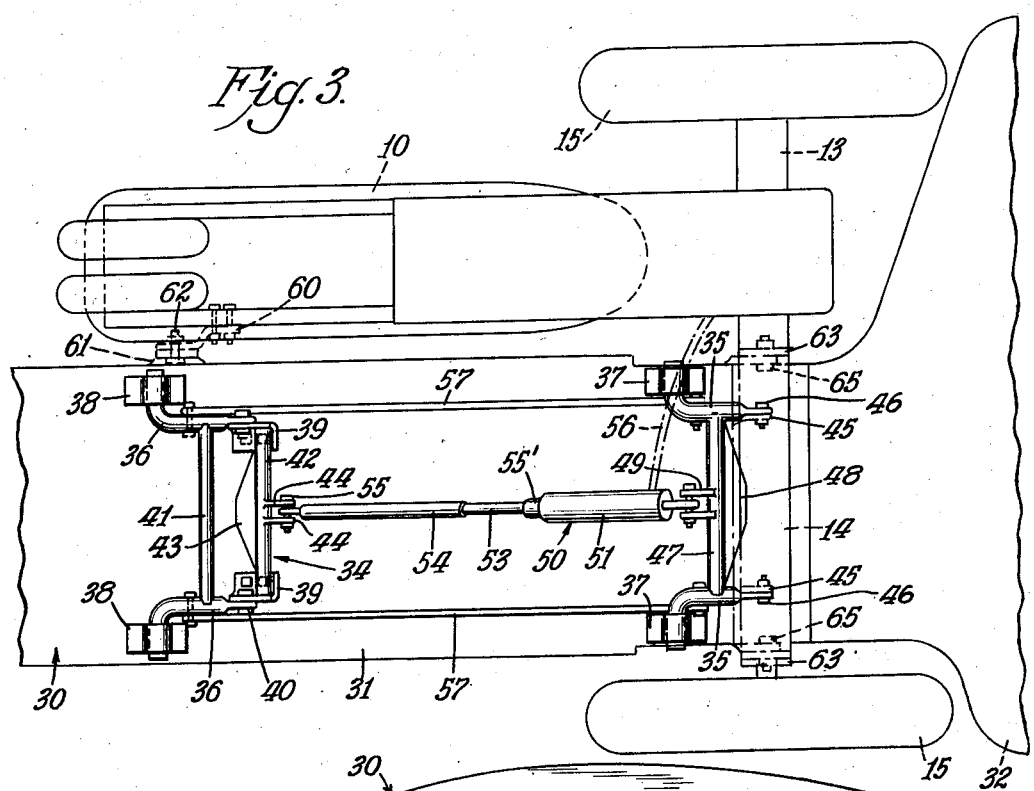
Figure 3 is a bottom view of a tractor having a harvester thresher mounted thereon, said harvester thresher having an implement lifting structure connected thereto.

The forward and rearward lifting struts 35 and 36 may be made of any suitable structural material but are preferably made of tubular members having their ends flattened as best shown in Figure 3. The flattened ends of the rearward lifting struts 36 are pivotally connected to supporting brackets 39 by means of bearing bolts 40. The supporting brackets 39 are rigidly secured to the harvester thresher 30 in any suitable manner. A transverse supporting member 41, as best shown in Figure 3, connects the rearward lifting struts 36. A transverse connecting member 42 including a gusset 43 and ear portions 44 is connected to the supporting brackets 39.

The forward lifting struts 35 are connected to a pair of projecting portions 45 positioned at the forward end of the harvester thresher 30 by means of bearing bolts 46. A member 47 extends transverely of and connects the forward lifting struts 36. This member 47 includes a gusset 48 and ear portions 49.

An expansible fluid pressure means 50 is pivotally connected to the ear portions 49 and includes a cylinder 51 in which there is mounted for reciprocation a piston 52 having a piston arm 53 to which is connected a piston arm extension 54. The piston arm extension 54 is pivotally connected to the connecting member 42 by means of the ear portions 44 and a bearing pin 55. A shoulder projection 55' is formed at one end of the cylinder 51, the purpose of which is to limit the retraction of the piston arm extension 54 when the harvester thresher 30 is in its unmounted position as indicated in Figure 1. A fluid pressure conduit 56 is in communication with the expansible fluid pressure means 50 and with the fluid pressure device 21. A pair of tension rods 57 are pivotally connected to the rearward lifting struts 35 and to the forward lifting struts 36.

Figure 4:
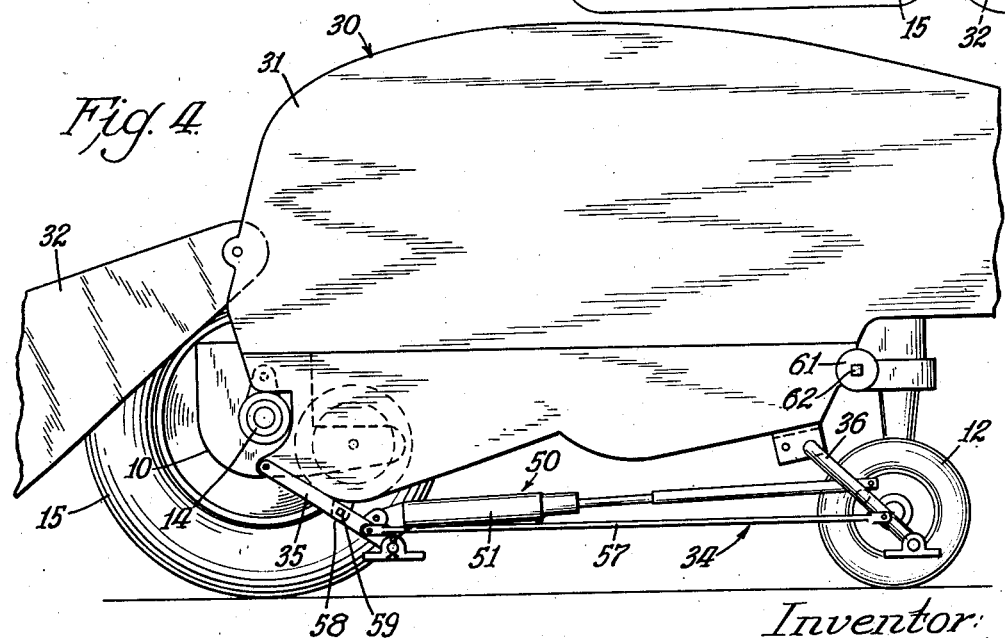
Figure 4 is a side elevational view of a harvester thresher having an implement lifting structure connected thereto in a retracted position; the harvester thresher and tractor, in this view, being rotated 180° from the position shown in the previous views in order to show the opposite side of the harvester thresher with the tractor in the background.

Connected to the forward portion of the harvester thresher 30 is a projecting portion 58 to which the forward lifting arms 36 may be connected by a bolt 59 for holding the implement lifting structure 34 in a retracted position as best shown in Figure 4.

A bracket 60 is rigidly connected to the longitudinal body portion 11 of the tractor 10 as best shown in Figure 3. A supporting boss 61 is formed on the harvester thresher 30 and a securing means in the form of a bolt 62 extends through the bracket 60 and into the supporting boss 61 for rigidly connecting the rear portion of the harvester thresher 30 to the tractor 10. A pair of supporting ears 63 are integrally formed in the right-hand extended axle housing 14 as best shown in Figure 3. These supporting ears 63 are adapted to cooperate with a pair of extending portions 64 integrally formed in the forward part of the harvester thresher 30. A bolt 65 extends through each of the supporting ears 63 and the extending portion 64 for securely mounting the forward end of the harvester thresher to the tractor 10.

The harvester thresher is normally supported on the ground by means of the implement lifting structure 34. The projecting portion 55' of the cylinder 51 abuts the piston arm extension 54 thereby retaining said implement lifting structure in a supporting position. The tractor is driven adjacent the harvester thresher so that the rearward portion of the tractor is in proximity to the forward portion of the harvester thresher.

When operating an implement of this type the tractor is connected to be driven rearwardly while the operator may shift his station from the tractor to the harvester thresher from where he will then control the operation of said implement. In mounting the implement to the tractor, the operator attaches the fluid pressure conduit 56 to the expansible fluid pressure 50 and to the fluid pressure device 21. He then moves the manual control lever 27 to cause operation of the power actuated device 19, thereby actuating the fluid pressure device 21 and the expansible fluid pressure means 50. The pressure exerted by the expansible fluid pressure means 50 causes the piston arm extenion 54 to move rotating said rearward and forward lifting struts 35 and 36 in a counter-clockwise manner thus raising the harvester thresher 30 vertically. Due to the selective control obtained by the valve arrangement for the fluid actuating device 19 as disclosed in the aforementioned application, the operator can adjust the vertical movement or position of the harvester thresher to any point desired within the range, of course, of the expansible fluid pressure means 50.

While lifting said harvester thresher 30 and adjusting the elevation thereof, the operator can also move the tractor longitudinally and transversely by means of the steering mechanism 17 and clutch control pedal 18, in order to bring the supporting ears 63 into proper alinement with the extending portions 64 thereby permitting the harvester thresher 30 to be rigidly secured to the tractor by means of the bolts 65. The operator therefore has complete and unified control in moving the harvester thresher to any vertical elevation that he may desire and at the same time is able to adjust the tractor laterally and longitudinally to the height necessary for mounting said harvester thresher onto the tractor. When the harvester thresher is properly mounted, the implement supporting structure is swung into the retracted position shown in Figure 4 and the pin 59 is placed through the forward lifting strut 35 and the projection 58 thus securing the implement supporting structure in a retracted position free from the ground.

While I have shown and described but a single preferred embodiment, it should be understood that numerous changes may be made in the construction, details and arrangement of the parts without departing from the spirit and scope of the present invention as disclosed and set forth in the appended claims.

What is claimed is:

1. Mounting means for an implement adapted to be mounted on a tractor and carried thereby comprising, an implement-lifting means for supporting the implement on the ground, fluid-pressure means operable to actuate said implement-lifting means for lifting the implement to an elevation sufficient for attaching the implement to a tractor in its mounted position, a power lift arm positioned on the tractor, said arm being swingable to a plurality of adjusted positions by a manual control, said manual control being positioned adjacent the operator's station, said tractor being operable in a fore and aft direction during manipulation of the power-lift arm, a fluid-pressure device mounted on the tractor and connected to said power-lift arm, flexible fluid-pressure transmitting means connecting the fluid-pressure device on the tractor and the fluid-pressure device on the implement-lifting means, and cooperating means for securing the implement to the tractor when the implement is in lifted position.

2. Mounting means for an implement adapted to be mounted on a tractor and carried thereby comprising, a lifting means adapted to support the implement on the ground, a fluid-actuating device operable to actuate said lifting means, means for lifting the implement to an elevation sufficient for attaching the implement to a tractor in its mounted position, a power lift arm positioned on the tractor, said arm being swingable to a plurality of adjusted positions, said tractor being operable in a fore and aft direction during manipulation of the power-lift arm, a fluid-pressure device mounted on the tractor and connected to said power lift arm, a flexible fluid-pressure transmitting means connecting the fluid-pressure device on the tractor and said fluid-actuated device on said lifting means, and cooperating means for securing the implement to the tractor when the implement is in lifted position.

3. Mounting means for an implement adapted to be mounted on a tractor and carried thereby comprising, hinged supporting struts for supporting the implement on the ground, fluid-pressure means operable to swing said struts for lifting the implement to an elevation sufficient for attaching the implement to a tractor in its mounted position, a power-lift arm positioned on the tractor, said arm being swingable to a plurality of adjusted positions by a manual control, said manual control being positioned adjacent the operator's station, said tractor being operable in a fore and aft direction during manipulation of the power-lift arm, a fluid-pressure device mounted on the tractor and connected to said power-lift arm, flexible fluid-pressure transmitting means connecting the fluid-pressure device on the tractor and the fluid-pressure means, and cooperating means on the implement and on the tractor adapted to be secured together when the implement is in lifted position to mount the implement on the tractor.

4. Mounting means for an implement adapted to be mounted on a tractor and carried thereby comprising, hinged supporting struts for supporting the implement on the ground, fluid-pressure means operable to swing said struts for lifting the implement to an elevation sufficient for attaching the implement to a tractor in its mounted position, a power-lift arm positioned on the tractor, said arm being swingable to a plurality of adjusted positions by a manual control, said manual control being positioned adjacent the operator's station, said tractor being operable in a fore and aft direction during manipulation of the power-lift arm, a fluid-pressure device mounted on the tractor and connected to said power-lift arm, flexible fluid-pressure transmitting means connecting the fluid-pressure device on the tractor and the fluid-pressure means, and cooperating means on the implement and on the tractor adapted to be secured together when the implement is in lifted position to mount the implement on the tractor, said swingable struts being retractable after the implement is lifted to a position free from engagement with the ground.

5. Mounting means for an implement adapted to be mounted on a tractor and carried thereby comprising, hinged supporting struts for supporting the front and the rear of the implement on the ground, an expansible fluid-pressure device operable to swing said struts for lifting the implement to an elevation sufficient for attaching the implement to a tractor in its mounted position, a power-lift arm positioned on the tractor, said arm being swingable to a plurality of adjusted positions by a manual control, said manual control being positioned adjacent the operator's station, said tractor being operable in a fore and aft direction during manipulation of the power-lift arm, a second expansible fluid-pressure device mounted on the tractor and connected to said power-lift arm, a flexible fluid-pressure transmitting conduit connecting said fluid-pressure devices, and cooperating means on the implement and on the tractor adapted to be secured together when the implement is in lifted position to mount the implement on the tractor.

6. Mounting means for an implement adapted to be mounted on a tractor and carried thereby comprising, hinged supporting struts for supporting the front and the rear of the implement on the ground, an expansible fluid-pressure device operable to swing said struts for lifting the implement to an elevation sufficient for attaching the implement to a tractor in its mounted position, a power-lift arm positioned on the tractor, said arm being swingable to a plurality of adjusted positions by a manual control, said manual control being positioned adjacent the operator's station, said tractor being operable in a fore and aft direction during manipulation of the power-lift arm, a second expansible fluid-pressure device mounted on the tractor and connected to said power-lift arm, a flexible fluid-pressure transmitting conduit connecting said fluid-pressure devices, and cooperating means on the implement and on the tractor adapted to be secured together when the implement is in lifted position to mount the implement on the tractor, said swingable struts being retractable after the implement is lifted to a position free from engagement with the ground.

RUSSEL D. ACTON.

REFERENCES CITED

The following references are of record in the file of this patent:

UNITED STATES PATENTS

| Number | Name | Date |
| --- | --- | --- |
| 2,222,116 | Mott | Nov. 19, 1940 |
| 2,250,964 | Poor et al. | July 29, 1941 |
| 2,376,541 | Johnson et al. | May 22, 1945 |
| 2,401,183 | Pool et al. | May 28, 1946 |